(12) United States Patent
Mukunoki et al.

(10) Patent No.: US 12,068,679 B2
(45) Date of Patent: Aug. 20, 2024

(54) POWER CONVERSION DEVICE PREVENTING OVERCURRENT AT THE TIME OF STARTING

(71) Applicant: Mitsubishi Electric Corporation, Tokyo (JP)

(72) Inventors: Kaho Mukunoki, Tokyo (JP); Toshiyuki Fujii, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 249 days.

(21) Appl. No.: 17/624,852

(22) PCT Filed: Aug. 8, 2019

(86) PCT No.: PCT/JP2019/031417
§ 371 (c)(1),
(2) Date: Jan. 5, 2022

(87) PCT Pub. No.: WO2021/024463
PCT Pub. Date: Feb. 11, 2021

(65) Prior Publication Data
US 2022/0263430 A1    Aug. 18, 2022

(51) Int. Cl.
*H02M 7/483* (2007.01)
*H02M 1/36* (2007.01)
*H02M 5/458* (2006.01)

(52) U.S. Cl.
CPC .......... *H02M 1/36* (2013.01); *H02M 5/4585* (2013.01); *H02M 7/4835* (2021.05)

(58) Field of Classification Search
CPC .................. H02M 5/45–4585; H02M 1/36
See application file for complete search history.

(56) References Cited

U.S. PATENT DOCUMENTS

2010/0246217 A1    9/2010  Sakakibara
2011/0019449 A1*   1/2011  Katoh .................... H02M 7/483
                                                       363/124

(Continued)

FOREIGN PATENT DOCUMENTS

JP          60-241718 A    11/1985
JP          10-14240 A      1/1998

(Continued)

OTHER PUBLICATIONS

International Search Report and Written Opinion mailed on Oct. 8, 2019, received for PCT Application PCT/JP2019/031417, Filed on Aug. 8, 2019, 10 pages including English Translation.

*Primary Examiner* — Peter M Novak
(74) *Attorney, Agent, or Firm* — XSENSUS LLP

(57) ABSTRACT

A power conversion device includes a voltage-type power converter and a current-type power converter each of which performs power conversion between AC and DC, and a controlling circuitry, and power is transmitted/received between AC sides via a DC circuit. In first starting control for starting the voltage-type power converter and the current-type power converter, the controlling circuitry controls a semiconductor element of at least one of the voltage-type power converter and the current-type power converter, to adjust DC voltage at DC terminals of the voltage-type converter to a set first voltage value, thereby controlling current flowing through the DC circuit to be first current not greater than a rated current value of the semiconductor elements.

19 Claims, 13 Drawing Sheets

(56) References Cited

U.S. PATENT DOCUMENTS

| | | | | |
|---|---|---|---|---|
| 2013/0033794 A1* | 2/2013 | Baek | ............ | B60L 58/10 |
| | | | | 361/93.9 |
| 2015/0311814 A1* | 10/2015 | Stolt | ............ | H02M 1/36 |
| | | | | 363/37 |
| 2019/0207533 A1 | 7/2019 | Kikuchi et al. | | |
| 2021/0226449 A1* | 7/2021 | Dong | ............ | H02J 3/1814 |

FOREIGN PATENT DOCUMENTS

| | | |
|---|---|---|
| JP | 11-299107 A | 10/1999 |
| JP | 2009-95149 A | 4/2009 |
| JP | 2018-78733 A | 5/2018 |
| WO | 2018/051587 A1 | 3/2018 |

* cited by examiner

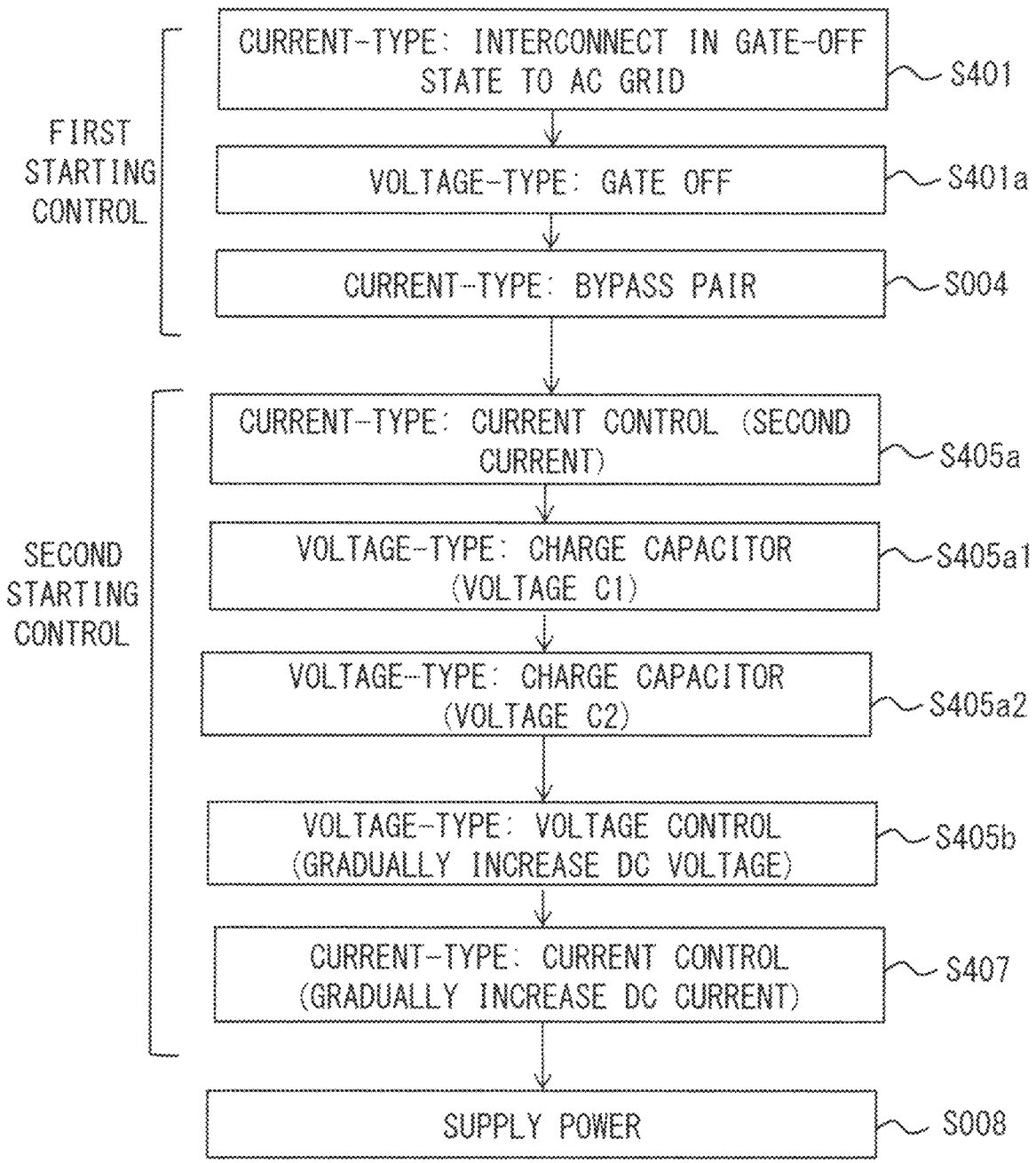

POWER CONVERSION DEVICE PREVENTING OVERCURRENT AT THE TIME OF STARTING

CROSS-REFERENCE TO RELATED APPLICATION

The present application is based on PCT filing PCT/JP2019/031417, filed Aug. 8, 2019, the entire contents of which are incorporated herein by reference.

TECHNICAL FIELD

The present disclosure relates to a power conversion device.

BACKGROUND ART

In recent years, distributed power supplies have been increasingly introduced. Therefore, a variety of devices are interconnected to power grids and thus the power grids are complicated. Also for AC/DC conversion devices, various types are used, including a current-type converter, a voltage-type converter, and the like. Each type is being introduced considering their respective advantages, e.g., the current-type converter is often inexpensive as compared to the voltage-type converter, and the voltage-type converter can have a high function as compared to the current-type converter. Therefore, it is expected that power transmission systems including the current-type converter and the voltage-type converter in a mixed manner, power transmission systems in which the current-type converter and the voltage-type converter are interconnected via a DC circuit, and the like will further increase in the coming years.

For example, in a motor driving device or an electric generator starting device, for achieving both low cost and a high function such as reducing harmonic output to a power grid of various types, the following power transmission system is conceivable: a converter that is interconnected to the power supply grid side and converts AC power to DC power is configured as a voltage-sourced converter (voltage-type converter), and a converter that is interconnected to a motor/electric generator side and converts AC power to DC power to drive/start a motor/electric generator is configured as a line-commutated converter (current-type converter) for the purpose of cost reduction. As such a power transmission system, DC power transmission equipment having the following configuration is disclosed.

That is, the conventional DC power transmission equipment includes a rectifier, a DC transmission line, an inverter, and a control device. The DC side of the rectifier and the DC side of the inverter are connected via the DC transmission line. The rectifier converts AC power to DC power and is configured as a line-commutated converter. The inverter converts DC power to AC power, and is a voltage-sourced converter configured using a self-turn-off element. Then, current control characteristics are imparted such that DC current of the voltage-sourced converter is set in accordance with the magnitude of AC voltage of the line-commutated converter and the DC current is controlled to be the set current value, thereby performing DC power transmission with DC voltage corresponding to the magnitude of reduction in the AC voltage (see, for example, Patent Document 1).

CITATION LIST

Patent Document

Patent Document 1: Japanese Laid-Open Patent Publication No. 11-299107

SUMMARY OF THE INVENTION

Problems to be Solved by the Invention

In the conventional DC power transmission equipment, when power transmission is performed from the line-commutated converter (current-type converter) to the voltage-sourced converter (voltage-type converter), DC power transmission is performed with DC voltage corresponding to AC voltage of an AC grid on the line-commutated converter side. Therefore, even in a case where malfunction has occurred in the AC grid on the line-commutated converter side and thus the AC voltage is reduced, DC power transmission can be performed without stopping operation. However, in the power conversion device having the configuration in which the current-type converter and the voltage-type converter are connected via the DC transmission line as described above, excessive current beyond the rated value might flow through the DC transmission line when the current-type converter and the voltage-type converter are started. Therefore, there is a problem that malfunction might occur in elements composing the current-type converter and the voltage-type converter.

The present disclosure has been made to solve the above problem, and an object of the present disclosure is to provide a power conversion device in which power is transferred between a current-type converter and a voltage-type converter and which is capable of preventing overcurrent at the time of starting so as to protect elements composing the current-type converter and the voltage-type converter.

Solution to the Problems

A power conversion device according to the present disclosure includes: a voltage-type first power converter and a current-type second power converter which have semiconductor elements for controlling conduction and interruption of current and perform power conversion between AC and DC; and a control unit for controlling the first power converter and the second power converter. First DC terminals on a DC side of the first power converter and second DC terminals on a DC side of the second power converter are connected via a DC circuit, and power is transmitted/received between different AC sides via the DC circuit. In first starting control for starting the first power converter and the second power converter, the control unit controls the semiconductor element provided in at least one of the first power converter or the second power converter, to adjust DC voltage at the first DC terminals of the first power converter to a set first voltage value, thereby controlling current flowing through the DC circuit to be first current not greater than a rated current value of the semiconductor elements.

Effect of the Invention

The power conversion device according to the present disclosure makes it possible to provide a power conversion device in which power is transferred between a current-type converter and a voltage-type converter and which is capable of preventing overcurrent at the time of starting so as to protect elements composing the current-type converter and the voltage-type converter.

BRIEF DESCRIPTION OF THE DRAWINGS

FIG. 13 is a flowchart showing control at the time of starting the power conversion device according to embodiment 4.

DESCRIPTION OF EMBODIMENTS

Embodiment 1

Hereinafter, a power conversion device 100 according to the present embodiment 1 will be described with reference to the drawings.

Figure 1:
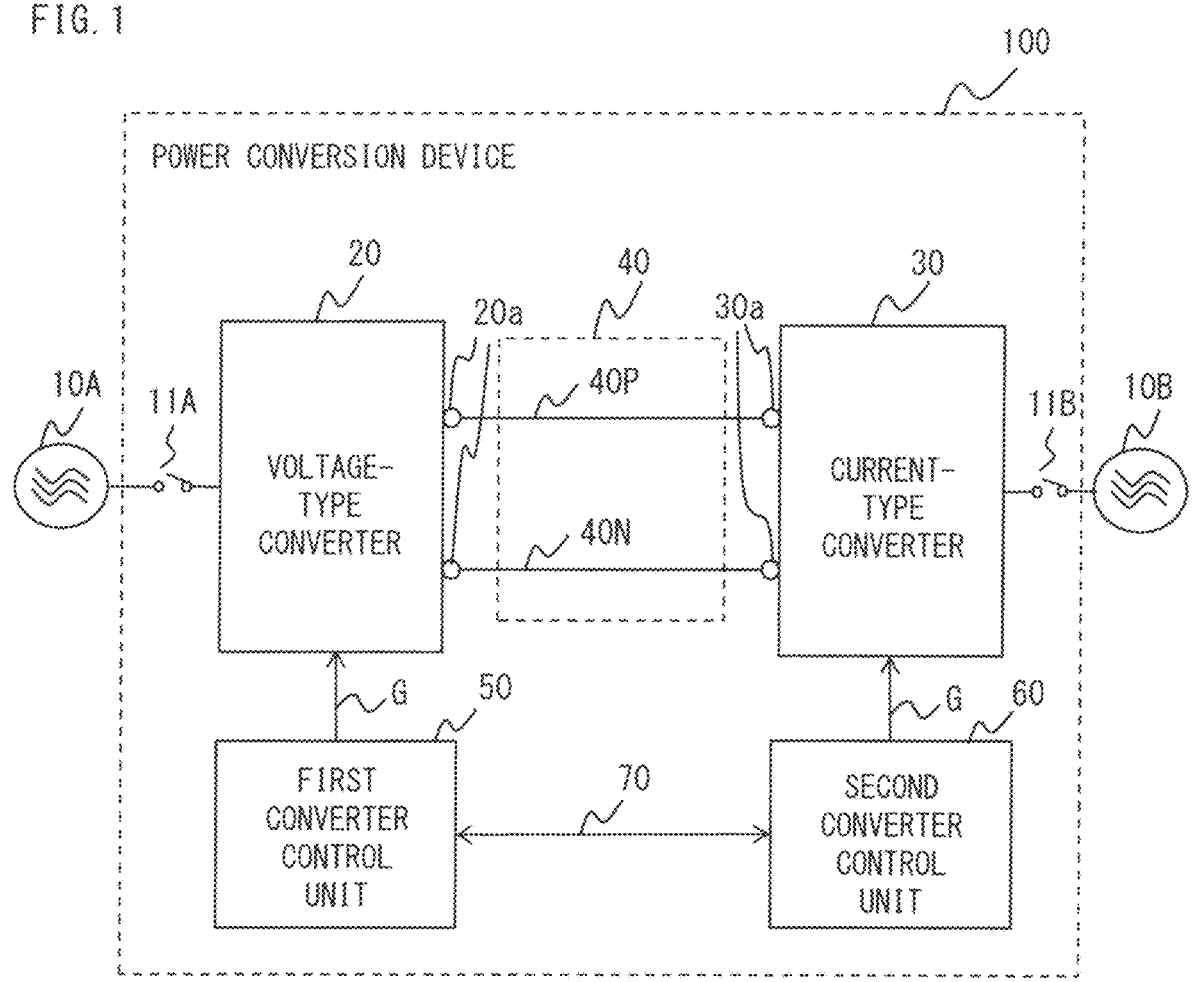
FIG. 1 is a schematic configuration diagram showing the entire configuration of a power conversion device according to embodiment 1.

FIG. 1 is a schematic configuration diagram showing the entire configuration of the power conversion device 100 according to embodiment 1.

As shown in FIG. 1, the power conversion device 100 is provided between two first and second AC circuits 10A and 10B different from each other, and performs bidirectional power reception/transmission between the first AC circuit 10A and the second AC circuit 10B.

The power conversion device 100 includes a voltage-type converter 20 as a first power converter for performing power conversion between AC and DC, a current-type converter 30 as a second power converter for performing power conversion between AC and DC, and a DC circuit 40 such as power transmission cables.

DC terminals 20a which are first DC terminals on the DC side of the voltage-type converter 20, and DC terminals 30a which are second DC terminals on the DC side of the current-type converter 30, are interconnected via the DC circuit 40. Thus, the power conversion device 100 converts AC power from one AC circuit (10A, 10B) to DC power and transmits the DC power via the DC circuit 40, and then converts the DC power to AC power again to supply the AC power to the other AC circuit (10B, 10A).

The AC side of the voltage-type converter 20 is interconnected to the first AC circuit 10A via a switch 11A. The AC side of the current-type converter 30 is interconnected to the second AC circuit 10B via a switch 11B.

Further, the power conversion device 100 includes, as a control unit, a first converter control unit 50 and a second converter control unit 60 for controlling the voltage-type converter 20 and the current-type converter 30, respectively. The first converter control unit 50 and the second converter control unit 60 are connected via a communication line 70.

Hereinafter, the configuration of the voltage-type converter 20 will be described.

Figure 2:
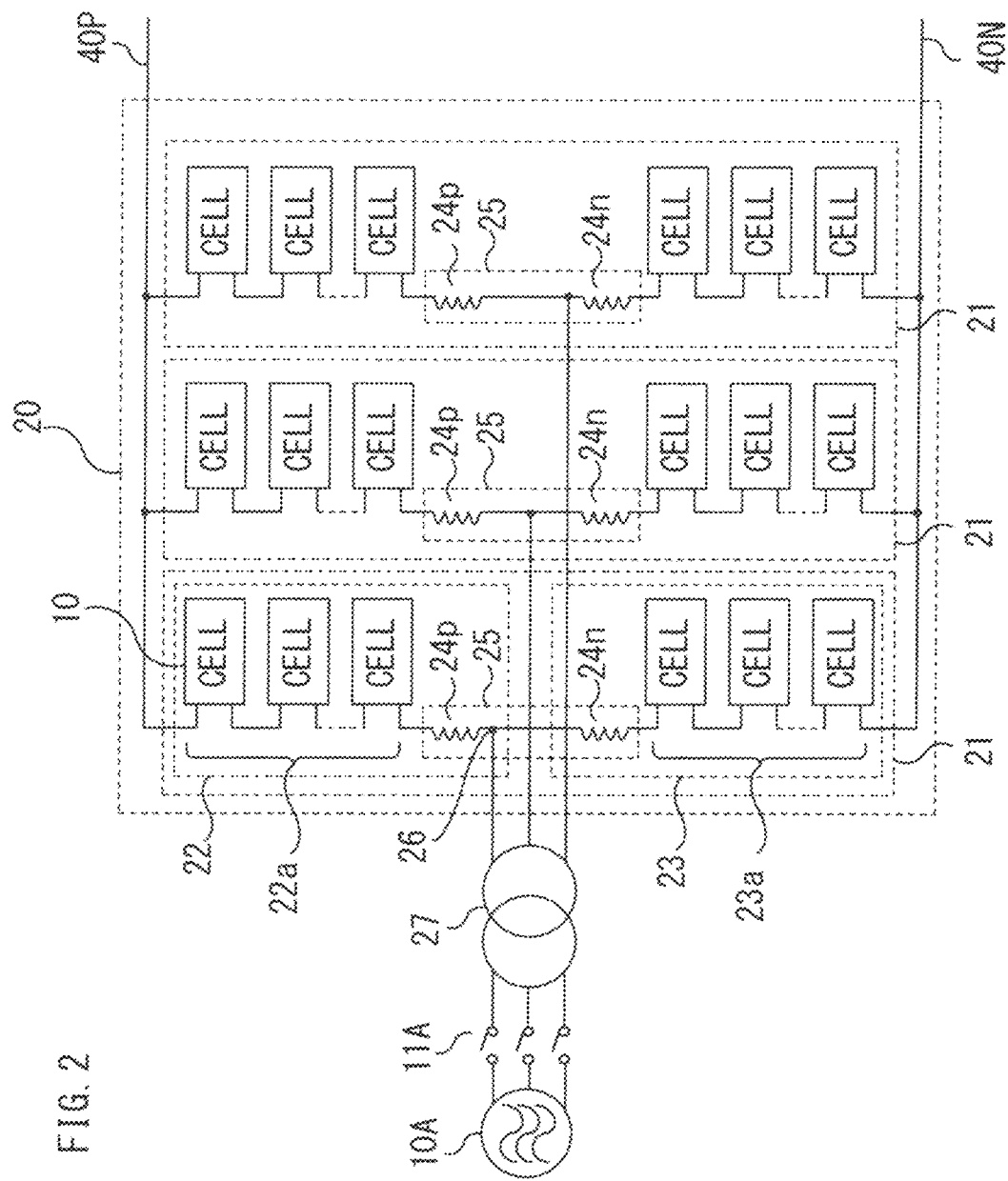
FIG. 2 shows a configuration example of a voltage-type converter according to embodiment 1.

FIG. 2 shows a configuration example of the voltage-type converter 20 according to embodiment 1.

Figure 3:
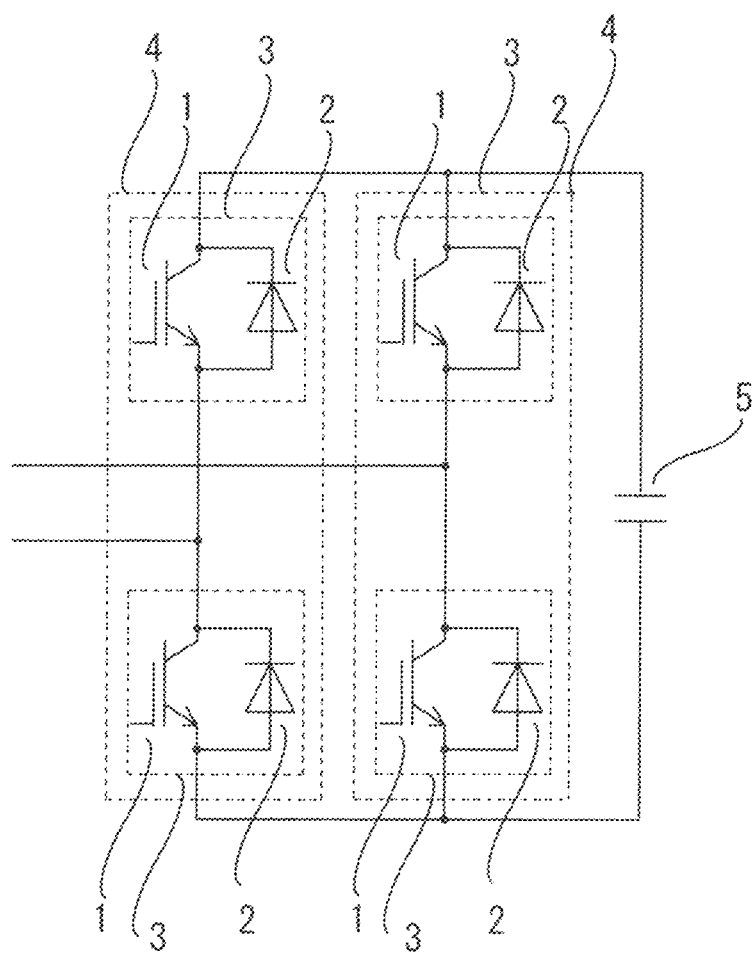
FIG. 3 shows a configuration example of a converter cell according to embodiment 1.

FIG. 3 shows a configuration example of a converter cell 10 included in the voltage-type converter 20 shown in FIG. 2.

As shown in FIG. 2, each phase of the voltage-type converter 20 is formed by a leg circuit 21 in which a positive arm 22 and a negative arm 23 are connected in series and an AC end 26 which is the connection point therebetween is connected to an AC line for each phase. The leg circuits 21 for the respective phases are connected in parallel between positive and negative DC buses 40P, 40N of the DC circuit 40.

The positive arm 22 and the negative arm 23 of the leg circuit 21 for each phase respectively include cell groups 22a, 23a each formed by connecting a plurality of converter cells 10 in series, and a positive reactor 24p and a negative reactor 24n are respectively interposed in series to the cell groups 22a, 23a.

The positive reactor 24p and the negative reactor 24n are interposed on the AC end 26 sides of the cell groups 22a, 23a, and a three-terminal reactor 25 is formed by the positive reactor 24p and the negative reactor 24n.

The positions where the positive reactor 24p and the negative reactor 24n are interposed may be any positions in the positive arm 22 and the negative arm 23, and a plural number of each reactor may be provided.

The AC end 26 for each phase of the voltage-type converter 20 is connected to the first AC circuit 10A via a transformer 27.

As shown in FIG. 3, each converter cell 10 included in the voltage-type converter 20 is composed of switching elements 1 which are self-turn-off semiconductor elements such as insulated gate bipolar transistors (IGBT) or gate commutated turn-off thyristors (GCT), for controlling conduction and interruption of current.

A diode 2 is connected in antiparallel to each switching element 1, thus forming a switch 3. A series unit 4 is formed by connecting a plurality (here, two) of the switches 3 in series.

The converter cell 10 has a full-bridge configuration in which two such series units 4 are connected in parallel and a DC capacitor 5 as an energy storage element for smoothing DC voltage is further connected in parallel to the series unit 4.

In the converter cell 10 configured as described above, intermediate connection points of the respective series units 4 are used as output ends, and through ON/OFF operations of the switching elements 1, positive voltage or negative voltage of the voltage across the DC capacitor 5 or zero voltage is selectively outputted from the output ends.

The configuration of the converter cell 10 is not limited to the above configuration as long as the converter cell 10 is composed of the series units 4 formed by the self-turn-off switching elements 1 and the DC capacitor 5 connected in parallel to the series units 4, and is capable of selectively outputting positive voltage or negative voltage of the voltage across the DC capacitor 5 or zero voltage from the output ends using the switching elements 1.

Next, the configuration of the current-type converter 30 will be described.

Figure 4:
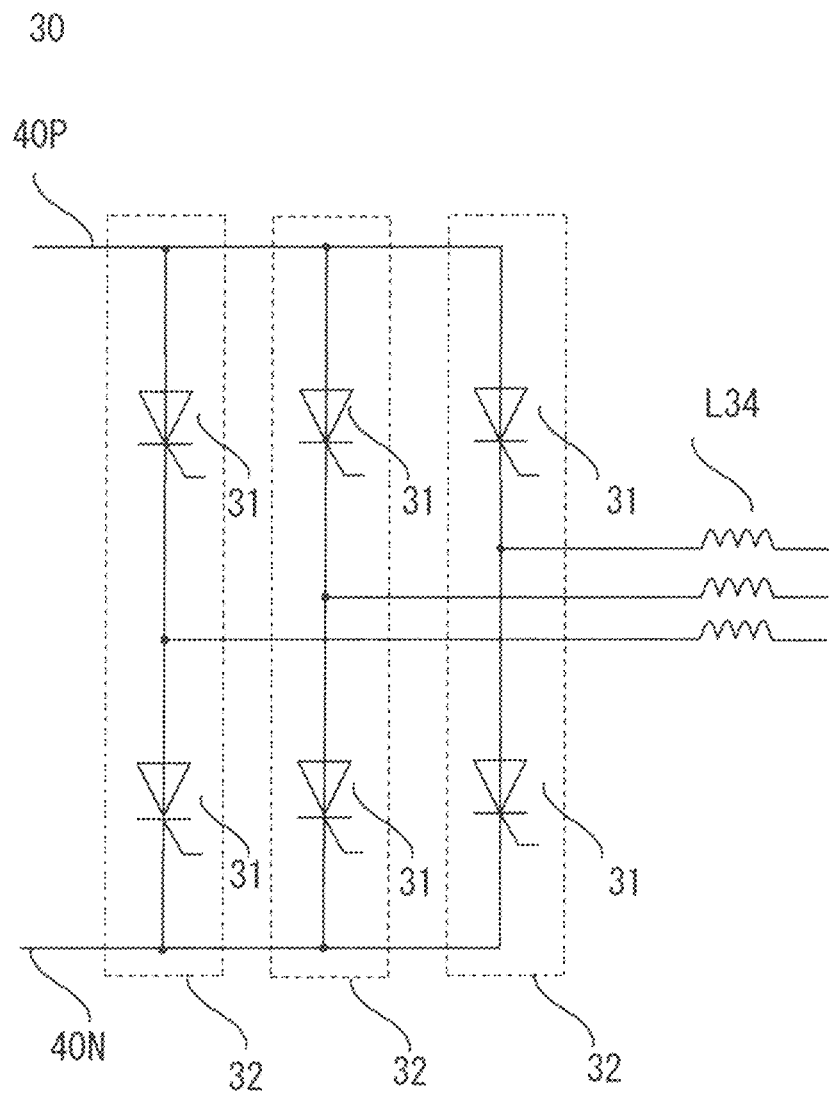
FIG. 4 shows a configuration example of a current-type converter according to embodiment 1.

FIG. 4 is a configuration example of the current-type converter 30 according to embodiment 1.

The current-type converter 30 is composed of a plurality of thyristor elements 31 for controlling conduction and interruption of current and which are semiconductor elements not having a self-turn-off function. A series unit 32 is formed by connecting a plurality (here, two) of the thyristor elements 31 in series.

The current-type converter 30 is formed by connecting three such series units 32 in parallel and connecting a reactor L34 on the AC terminal side of an intermediate connection point of each series unit 32.

Each thyristor element 31 is arranged with its cathode on the negative DC bus 40N side and its anode on the positive DC bus 40P side.

It is noted that DC current transmitted via the DC bus 40P such as a long-distance cable is supplied via a reactance due to the DC bus 40P, and the reactance due to the DC bus 40P serves as a reactance component. Therefore, in the current-type converter 30 shown in FIG. 4, reactors are not essential on the DC side.

The configuration shown in FIG. 4 is merely an example, and the current-type converter 30 may have any other configuration that serves as a current-type converter.

Hereinafter, the configurations of the first converter control unit 50 and the second converter control unit 60 for controlling the voltage-type converter 20 and the current-type converter 30 will be described.

In the present embodiment, it is assumed that the first AC circuit 10A is a three-phase AC power supply, the second AC circuit 10B is a motor, and the power conversion device 100 supplies power from the first AC circuit 10A which is the AC power supply to the second AC circuit 10B which is the motor.

First, the configuration of the first converter control unit 50 for controlling the voltage-type converter 20 will be described.

Figure 5:
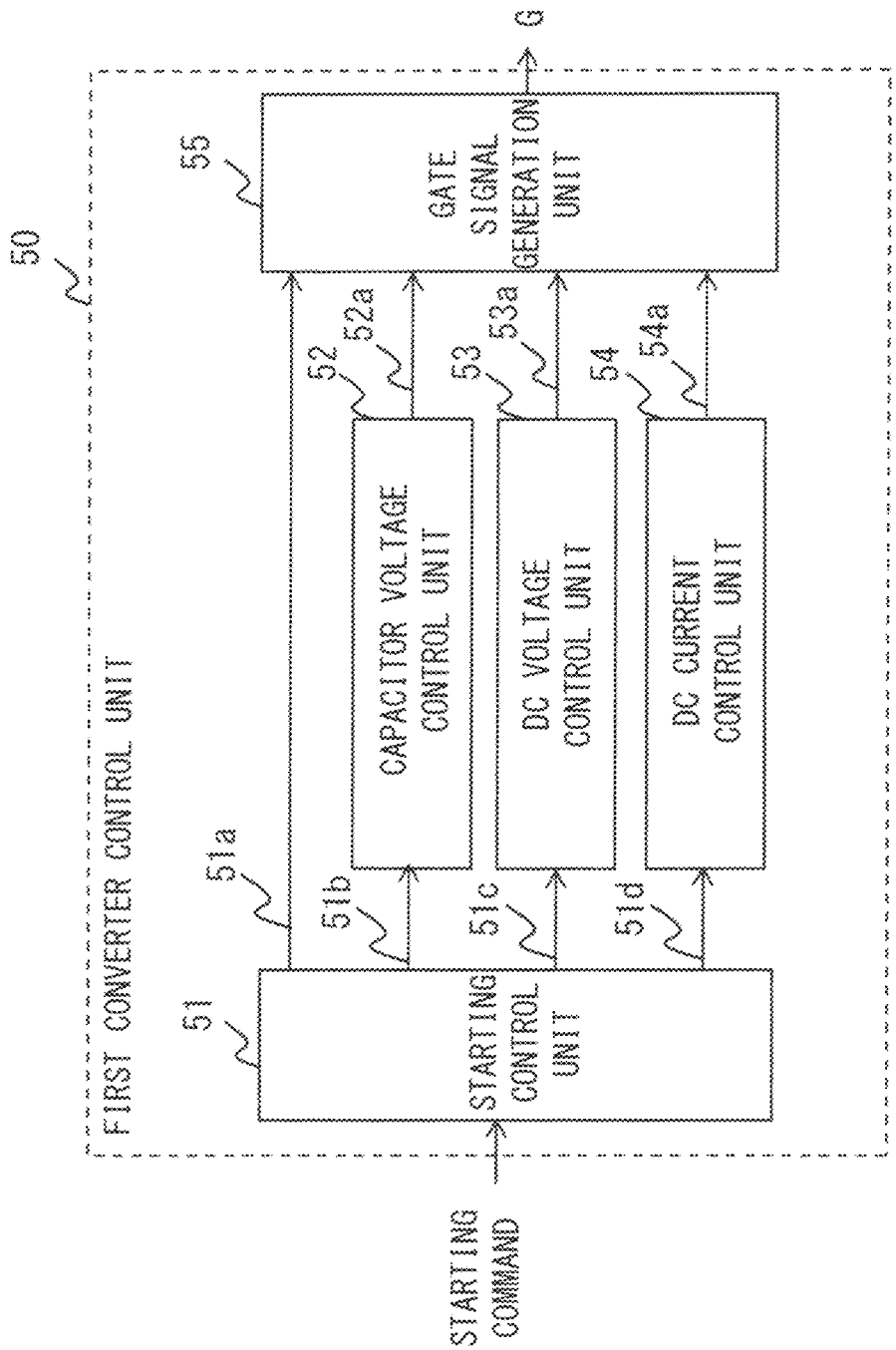
FIG. 5 is a configuration diagram of a first converter control unit for controlling the voltage-type converter according to embodiment 1.

FIG. 5 is a configuration diagram of the first converter control unit 50 for controlling the voltage-type converter 20 according to embodiment 1.

As shown in FIG. 5, the first converter control unit 50 includes a starting control unit 51, a capacitor voltage control unit 52, a DC voltage control unit 53, a DC current control unit 54, and a gate signal generation unit 55.

The capacitor voltage control unit 52 generates a voltage command value 52a for causing voltage of the DC capacitor 5 in each converter cell 10 included in the voltage-type converter 20 to follow set voltage.

The DC voltage control unit 53 generates a voltage command value 53a for causing terminal voltage at the DC terminals 20a on the DC side of the voltage-type converter 20 to follow set voltage.

The DC current control unit 54 generates a current command value 54a for causing flowing current of the DC circuit 40 to follow a set current value.

The gate signal generation unit 55 generates a gate signal G for controlling the switching elements 1 in each converter cell 10 of the voltage-type converter 20, on the basis of the voltage command values 52a, 53a and the current command value 54a outputted from the capacitor voltage control unit 52, the DC voltage control unit 53, and the DC current control unit 54.

The starting control unit 51 generates command signals 51a, 51b, 51c, 51d for operating the gate signal generation unit 55, the capacitor voltage control unit 52, the DC voltage control unit 53, and the DC current control unit 54, respectively, on the basis of a starting command received from a command unit, an external operating person, or the like (not shown). The details of command control performed by the starting control unit 51 will be described later.

Next, the configuration of the second converter control unit 60 for controlling the current-type converter 30 will be described.

Figure 6:
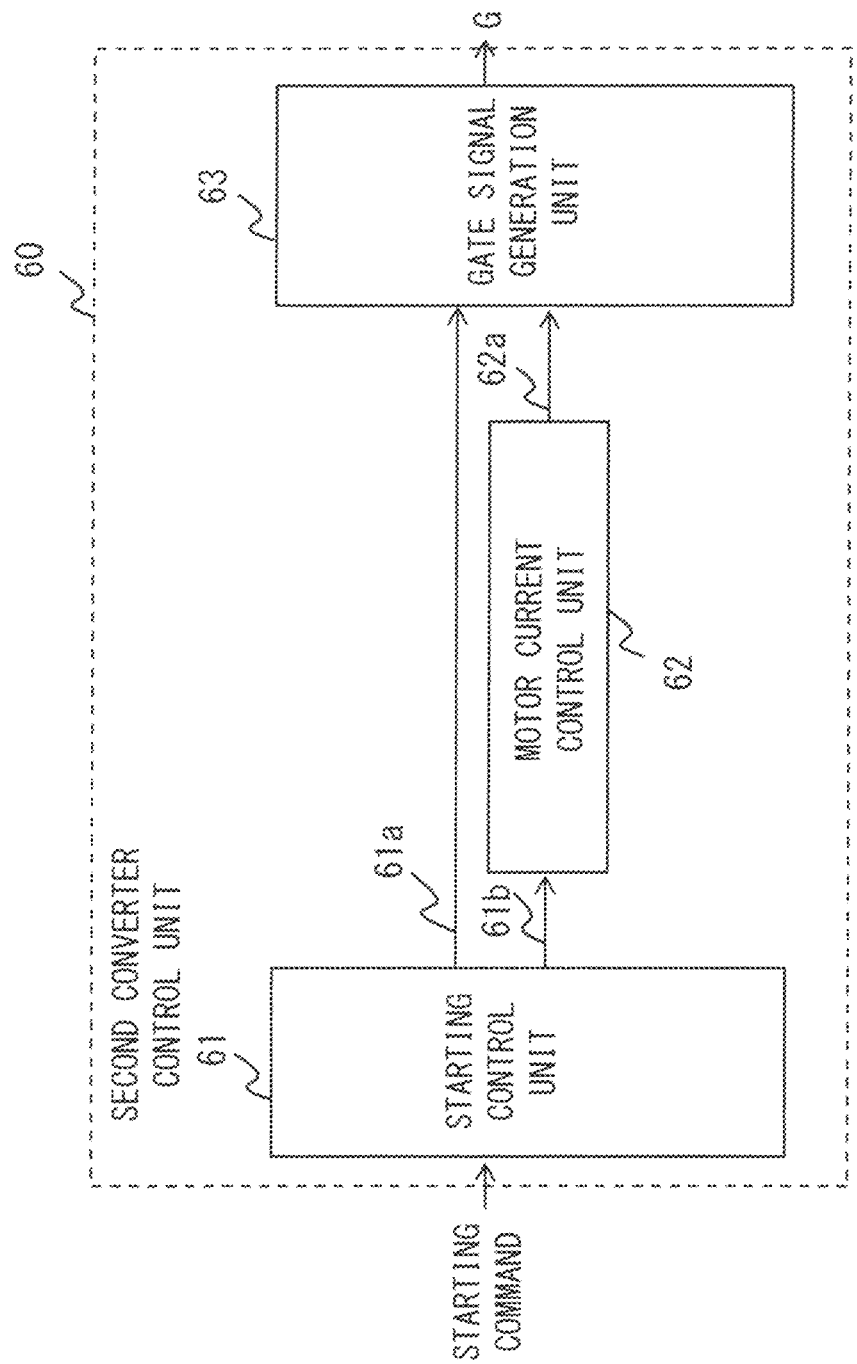
FIG. 6 is a configuration diagram of a second converter control unit for controlling the current-type converter according to embodiment 1.

FIG. 6 is a configuration diagram of the second converter control unit 60 for controlling the current-type converter 30 according to embodiment 1.

The second converter control unit 60 includes a starting control unit 61, a motor current control unit 62, and a gate signal generation unit 63.

The motor current control unit 62 calculates a current value required for control of the second AC circuit 10B (motor) connected to the AC side of the current-type converter 30, to generate a current command value 62a.

The gate signal generation unit 63 generates a gate signal G for controlling each thyristor element 31 of the current-type converter 30, on the basis of the current command value 62a from the motor current control unit 62.

The starting control unit 61 generates command signals 61a, 61b for operating the gate signal generation unit 63 and the motor current control unit 62. The details of command control performed by the starting control unit 61 will be described later.

Hereinafter, as a major part of the power conversion device 100 according to the present embodiment, control at the time of starting the voltage-type converter 20 and the current-type converter 30 by the first converter control unit 50 and the second converter control unit 60, i.e., control at the time of starting the power conversion device 100, will be described.

Figure 7:
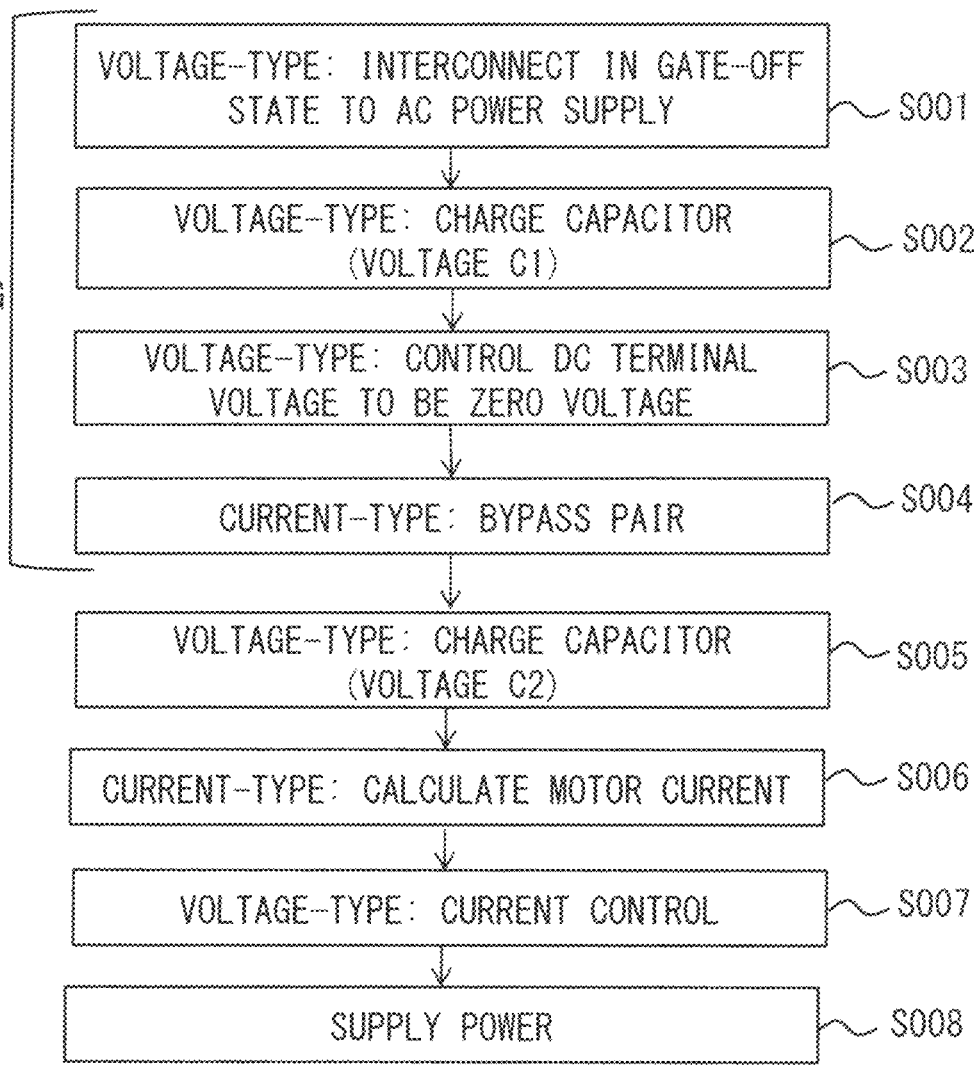
FIG. 7 is a flowchart showing control at the time of starting the power conversion device according to embodiment 1.

FIG. 7 is a flowchart showing control at the time of starting the power conversion device 100, performed by the first converter control unit 50 and the second converter control unit 60 according to embodiment 1.

It is noted that, before the power conversion device 100 is started, the switch 11A and the switch 11B are both controlled in an opened state and the power conversion device 100 is not interconnected to the AC side.

First, the first converter control unit 50 starts the voltage-type converter 20.

The starting control unit 51 of the first converter control unit 50 commands the gate signal generation unit 55 by the command signal 51a, to control the voltage-type converter 20 into a gate-OFF state.

In addition, the starting control unit 51 controls the switch 11A into a closed state, thereby interconnecting the voltage-type converter 20 in a gate-OFF state to the first AC circuit 10A (AC power supply) (step S001).

The DC capacitor 5 in each converter cell 10 of the voltage-type converter 20 is charged until the voltage thereof reaches a set charge voltage value C1 (step S002).

Next, after the DC capacitors 5 are charged to the set charge voltage value C1, the starting control unit 51 of the first converter control unit 50 commands the gate signal generation unit 55 by the command signal 51*a*, to start gate-ON/OFF operations of the switching elements 1 of the voltage-type converter 20. At the same time, the starting control unit 51 commands the DC voltage control unit 53 by the command signal 51*c*, so that the DC voltage control unit 53 generates the voltage command value 53*a* for adjusting the DC voltage at the DC terminals 20*a* to a set first voltage value V1. In the present embodiment, the first voltage value V1 is set at zero voltage.

The gate signal generation unit 55 generates the gate signal G on the basis of the voltage command value 53*a*.

The voltage-type converter 20 controls each converter cell 10 in accordance with the gate signal G, to control the DC voltage at the DC terminals 20*a* to be zero (step S003).

Next, the second converter control unit 60 starts the current-type converter 30.

First, the second converter control unit 60 controls the switch 11B from an opened state into a closed state by the starting control unit 61, thereby interconnecting the current-type converter 30 to the second AC circuit 10B (motor).

Then, the starting control unit 61 commands the gate signal generation unit 63 by the command signal 61*a*, to control the current-type converter 30 so that the thyristor element 31 connected to the DC bus 40P side of the current-type converter 30 and the thyristor element 31 connected to the negative DC bus 40N side thereof are turned on at the same time, i.e., brought into a bypass pair state (step S004).

In this way, when the bypass pair state is established for the purpose of starting the current-type converter 30, a closed circuit is formed in which current flows among the voltage-type converter 20, the DC circuit 40, and the current-type converter 30. At this time, the DC voltage of the DC terminals 20*a* of the voltage-type converter 20 has been controlled to be the first voltage value V1 (zero voltage), and the current-type converter 30 operates as a current source. Since power transmission/reception does not occur in the current-type converter 30, at this time, current (first current I1) sufficiently smaller than a rated current value Im of each element included in the voltage-type converter 20 and the current-type converter 30 flows through the DC circuit 40. Therefore, current flowing through the current-type converter 30 is also sufficiently smaller than the rated current value Im. The DC voltage at the DC terminals 20*a* of the voltage-type converter 20 slightly increases in accordance with the first current I1 and the resistance value of the DC circuit 40 (closed circuit).

As described above, the first voltage value V1 of the command by the DC voltage control unit 53 of the first converter control unit 50 is a voltage value set so that current flowing through the closed circuit passing the DC circuit 40 becomes the first current I1 not greater than the rated current value Im when the voltage-type converter 20 and the current-type converter 30 are started.

In the present embodiment, the first voltage value V1 is set at zero voltage as described above. However, the first voltage value V1 may be set to be greater than zero voltage as long as current flowing through the closed circuit passing the DC circuit 40 is not greater than the rated current value Im. The first voltage value V1 can be set mainly on the basis of the resistance value of the DC circuit 40. In the present embodiment, if the first voltage value V1 is set to a value within 0 V+3% of the rated voltage of the DC circuit 40, the voltage of the DC circuit 40 can be assuredly controlled to the first current I1.

The control for adjusting current flowing through the DC circuit 40 to the first current I1 not greater than the rated current value Im at the time of starting the voltage-type converter 20 and the current-type converter 30 by performing the control shown in the above steps S001 to S004, is referred to as first starting control.

Next, while controlling the DC voltage of the DC terminals 20*a* to be zero by the DC voltage control unit 53, the first converter control unit 50 commands the capacitor voltage control unit 52 by the command signal 51*b*, to charge the DC capacitor 5 of each converter cell 10 so that the voltage thereof reaches a set charge voltage value C2 (step S005).

Next, the second converter control unit 60 commands the motor current control unit 62 by the command signal 61*b*, so that the motor current control unit 62 calculates a current value (third current I3) required for control of the second AC circuit 10B (motor). The calculated value is sent as the current command value 62*a* to the first converter control unit 50 via the communication line 70 (step S006).

Next, the first converter control unit 50 commands the DC current control unit 54 by the command signal 51*d*, to switch the control of the voltage-type converter 20 from voltage control by the DC voltage control unit 53 to current control by the DC current control unit 54 (step S007). At this time, the current command value 54*a* to be outputted from the DC current control unit 54 is generated on the basis of the value of the third current I3 calculated by the motor current control unit 62.

On the basis of the current command value 54*a* from the DC current control unit 54 and the voltage command value 52*a* from the capacitor voltage control unit 52, the voltage-type converter 20 keeps the voltage of the DC capacitor 5 at the set charge voltage value C2 and supplies the third current I3 required for the motor control.

The second converter control unit 60 commands the gate signal generation unit 63 by the command signal 61*a*, to start switching control of performing gate-ON/OFF operations of the thyristor elements 31 in the current-type converter 30, thereby outputting AC power to the second AC circuit 10B (motor) (step S008).

In this way, control of the second AC circuit 10B (motor) is started and thus the second AC circuit 10B (motor) is started with the third current I3. At this time, the voltages of the DC terminals 20*a*, 30*a* have voltage values determined by the induced voltage of the motor and a turn-on angle for each thyristor element 31 by the current-type converter 30.

Performing start of the power conversion device 100 using the first control as described above enables the power conversion device 100 to be started so that excessive current beyond the rated current value Im does not flow and excessive voltage is not applied in the voltage-type converter 20 and the current-type converter 30.

The second AC circuit 10B is assumed to be a motor in the above description, but may be an electric generator, for example.

In a case where both of the first AC circuit 10A and the second AC circuit 10B are power grids, the power conversion device 100 operates as a back-to-back (BTB) system or a high voltage direct current (HVDC) system for transmitting high-voltage DC power. Also in this case, the same effects can be obtained.

In the above description, the switching elements 1 of the voltage-type converter 20 are controlled, and the thyristor elements 31 of the current-type converter 30 are controlled into a bypass-pair state, whereby current flowing through the DC circuit 40 is controlled to be the first current I1 not greater than the rated current value Im.

However, without limitation to the above control, the semiconductor elements of at least one of the voltage-type converter 20 or the current-type converter 30 may be controlled as long as the DC voltage at the DC terminals 20a of the voltage-type converter 20 is adjusted to the first voltage value V1.

The power conversion device of the present embodiment configured as described above includes:

a voltage-type first power converter and a current-type second power converter which have semiconductor elements for controlling conduction and interruption of current and perform power conversion between AC and DC; and a control unit for controlling the first power converter and the second power converter, wherein first DC terminals on a DC side of the first power converter and second DC terminals on a DC side of the second power converter are connected via a DC circuit, and power is transmitted/received between different AC sides via the DC circuit, and in first starting control for starting the first power converter and the second power converter, the control unit controls the semiconductor element provided in at least one of the first power converter or the second power converter, to adjust DC voltage at the first DC terminals of the first power converter to a set first voltage value, thereby controlling current flowing through the DC circuit to be first current not greater than a rated current value of the semiconductor elements.

As described above, the power converter interconnected to one AC circuit is configured as a voltage-type converter, whereby harmonics flowing out to the AC circuit can be reduced and the function of the power conversion device can be enhanced. Further, the power converter interconnected to the other AC circuit is configured as a current-type converter, whereby unnecessary cost increase of the power conversion device can be avoided.

Here, in the case where the voltage-type converter and the current-type converter are connected via the DC circuit, when the current-type converter is started, the current-type converter operates as a current source, so that overcurrent beyond the rated values of the semiconductor elements might flow through the DC circuit.

In the power conversion device of the present embodiment, through the first starting control for starting the voltage-type converter and the current-type converter, the DC voltage at the DC terminals of the voltage-type converter is adjusted to the set first voltage value, whereby current flowing through the DC circuit can be controlled to be the first current not greater than the rated current value of the semiconductor elements. In this way, overcurrent at the time of starting is prevented and the power conversion device can be started without stressing the semiconductor elements.

Thus, it is possible to provide a power conversion device that has a high function, is low in cost, and is highly reliable so that the semiconductor elements can be protected.

In the power conversion device of the present embodiment configured as described above, in the first starting control, the control unit controls the semiconductor element of the first power converter to adjust the voltage of the first DC terminals of the first power converter to the first voltage value, and controls the semiconductor element of the second power converter so that the second power converter comes into a bypass-pair state.

As described above, when the current-type converter is brought into a bypass-pair state for the purpose of starting the current-type converter, even if the voltage of the DC circuit becomes zero voltage, the semiconductor element of the voltage-type converter is controlled so that current flowing through the DC circuit becomes current not greater than the rated current value, thereby adjusting the DC terminal voltage on the voltage-type converter side to the first voltage value. Thus, overcurrent at the time of starting in the power conversion device in which the voltage-type converter and the current-type converter are interconnected can be prevented.

Normally, in the current-type converter, when flowing current is interrupted with all the semiconductor elements turned off, overvoltage might be applied to the semiconductor elements due to current based on a DC reactor component. Therefore, it is necessary to form a current circuit for constantly causing current to flow therethrough.

In the power conversion device of the present embodiment, the current-type converter is brought into a bypass-pair state, thereby forming a path through which current flows via the DC circuit between the voltage-type converter and the current-type converter. Thus, overvoltage can be prevented from being applied to the semiconductor elements at the time of starting, whereby a power conversion device having even higher reliability can be provided.

In the power conversion device of the present embodiment configured as described above, a current path through which the first current flows in the first starting control is a closed circuit formed via the DC circuit between the first power converter and the second power converter.

As described above, in the first starting control, the closed circuit through which current flows is formed between the voltage-type converter and the current-type converter, whereby a path through which current constantly flows can be assuredly formed at the time of the first starting.

In the power conversion device of the present embodiment configured as described above, the first voltage value is set on the basis of a resistance value in the DC circuit.

As described above, in the first starting control, the first voltage value at the DC terminals of the voltage-type converter is set on the basis of the resistance value of the DC circuit. Thus, current flowing through the DC circuit in the first starting control can be accurately adjusted to the first current not greater than the rated current value.

In the power conversion device of the present embodiment configured as described above, the first voltage value is a value within 0 V+3% of rated voltage of the DC circuit.

As described above, by setting the first voltage value to a value within 0 V+3% of rated voltage of the DC circuit, current flowing through the DC circuit in the first starting control can be assuredly adjusted to the first current not greater than the rated current value.

In the power conversion device of the present embodiment configured as described above, the first power converter is a voltage-sourced power converter configured using the semiconductor element of a self-turn-off type, and the second power converter is a line-commutated power converter configured using a thyristor element as the semiconductor element.

With the above configuration, equipment for power supply and phase modification is not needed in the AC circuit to which the voltage-type converter is interconnected, and thus it becomes possible to supply power not depending on the AC circuit. In addition, large current can be efficiently controlled in the current-type converter.

In the power conversion device of the present embodiment configured as described above, the first power converter includes a plurality of leg circuits connected to AC lines for respective phases and each having a positive arm and a negative arm connected in series, the plurality of leg circuits being connected in parallel between positive and negative DC buses, and each of the positive arm and the negative arm of each leg circuit includes a plurality of converter cells connected in series, the plurality of converter cells each being composed of a series unit of the semiconductor elements of a self-turn-off type connected in series to each other, and an energy storage element connected in parallel to the series unit.

As described above, the voltage-type converter is configured with converter cells multiplexed, whereby the converter capacity can be increased and the outputs thereof are synthesized so that harmonics included in the output voltage waveform can be reduced.

Thus, harmonic current flowing out to the AC grid can be further reduced.

Embodiment 2

Hereinafter, embodiment 2 of the present disclosure will be described, focusing on difference from the above embodiment 1, with reference to the drawings. The same parts as in the above embodiment 1 are denoted by the same reference characters and description thereof is omitted.

Figure 8:
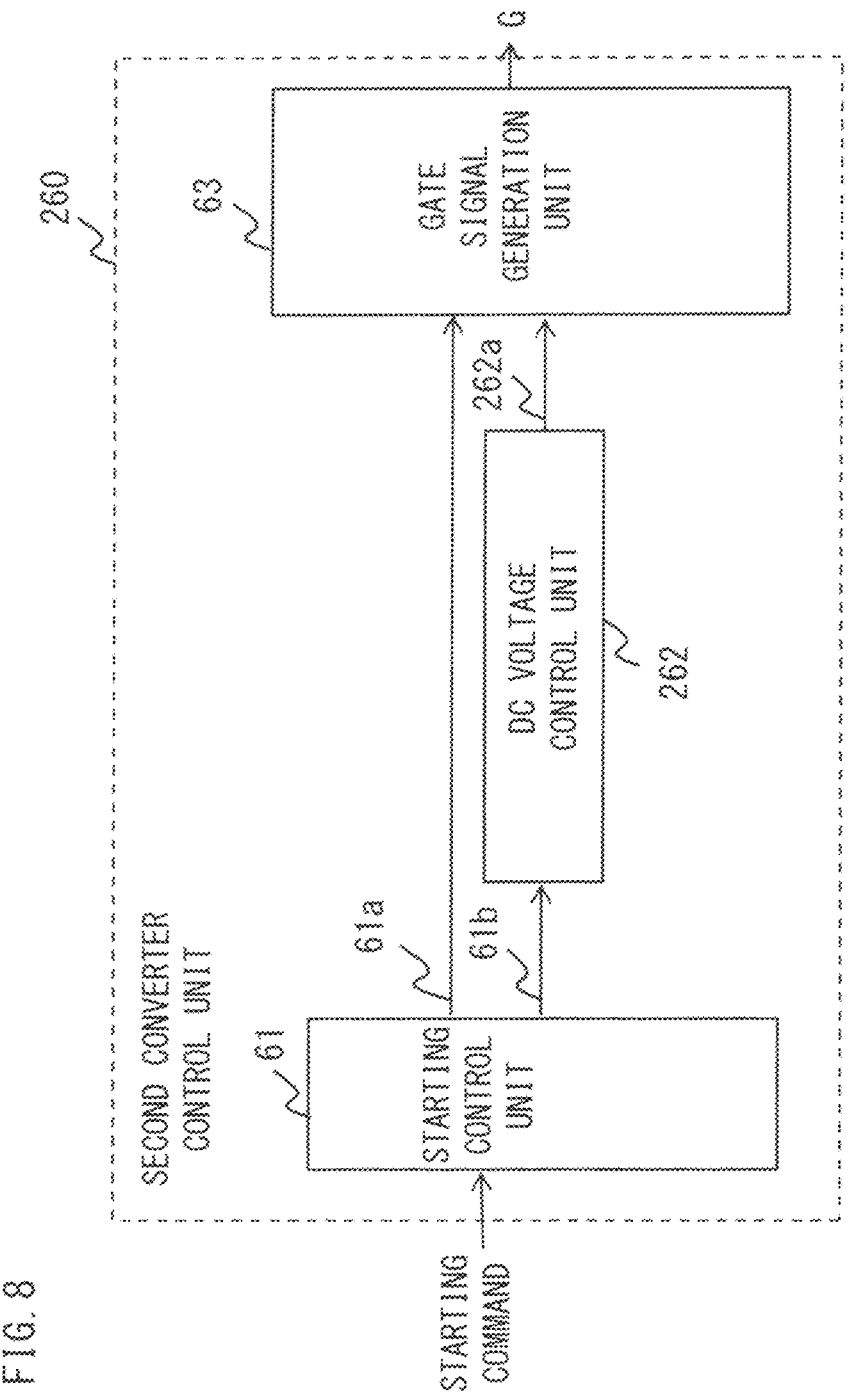
FIG. 8 is a configuration diagram of a second converter control unit for controlling a current-type converter according to embodiment 2.

FIG. 8 is a configuration diagram of a second converter control unit 260 for controlling the current-type converter 30 according to embodiment 2.

Figure 9:
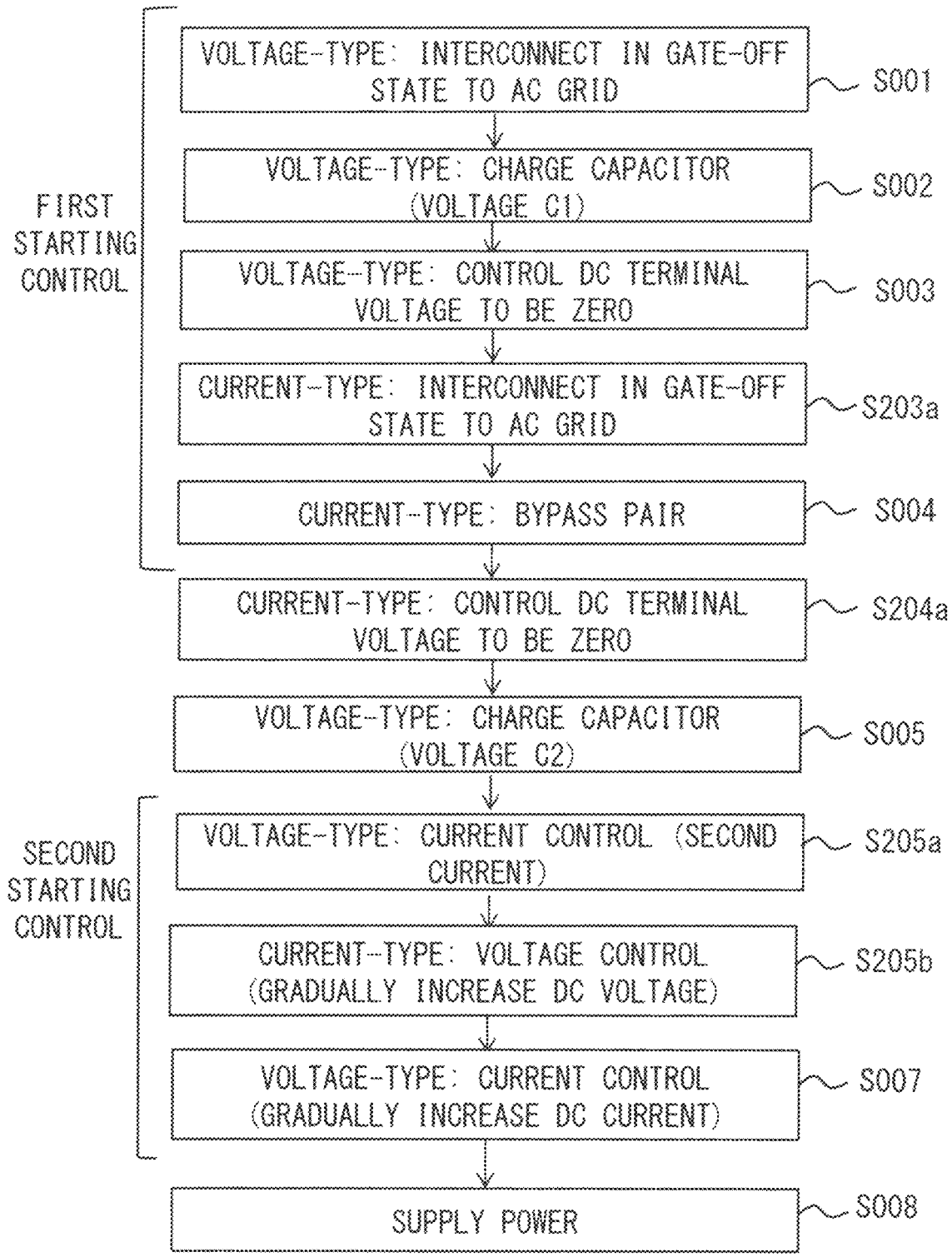
FIG. 9 is a flowchart showing control at the time of starting the power conversion device according to embodiment 2.

FIG. 9 is a flowchart showing control at the time of starting the power conversion device 100, performed by the first converter control unit 50 and the second converter control unit 260 according to embodiment 2.

In the present embodiment, a method for starting the power conversion device 100 in a case where the second AC circuit 10B connected to the current-type converter 30 side is an AC power supply such as a power grid, will be described.

The power conversion device 100 of the present embodiment supplies power from the first AC circuit 10A to the second AC circuit 10B.

As shown in FIG. 8, in the second converter control unit 260 of the present embodiment, a DC voltage control unit 262 is provided instead of the motor current control unit 62 in the second converter control unit 60 shown in embodiment 1.

Hereinafter, operation at the time of starting the power conversion device 100 in the present embodiment 2 will be described.

As in the first starting control shown in embodiment 1, also in the present embodiment, first starting control is performed through steps S001 to S004.

In the present embodiment, since the second AC circuit 10B is assumed to be an AC power supply, the thyristor elements 31 of the current-type converter 30 are controlled into a gate-OFF state at the time of interconnecting the current-type converter 30 to the second AC circuit 10B in the first starting control (step S203a).

Thus, the current-type converter 30 is controlled into a bypass-pair state, the DC voltage at the DC terminals 20a of the voltage-type converter 20 is controlled to be the first voltage value V1 (zero voltage), and current flowing through the DC circuit 40 is controlled to be the first current I1 not greater than the rated current value Im.

After the voltage-type converter 20 and the current-type converter 30 are started through execution of the first starting control, the starting control unit 61 of the second converter control unit 260 commands the gate signal generation unit 63 by the command signal 61a, to start gate-ON/OFF operations of the thyristor elements 31 in the current-type converter 30. When power conversion is started by this switching control, at the same time, the starting control unit 61 commands the DC voltage control unit 262 by the command signal 61b, so that the DC voltage control unit 262 generates a voltage command value 262a for adjusting the DC voltage at the DC terminals 30a to a set second voltage value V2.

The second voltage value V2 is set to a value not greater than the first voltage value V1 to which the DC terminals 20a of the voltage-type converter 20 are adjusted in the first starting control, and in the present embodiment, is zero voltage which is the same as the first voltage value V1. It is noted that the second voltage value V2 may be a value within 0 V+3% of the rated voltage of the DC circuit 40, including a margin.

The gate signal generation unit 63 generates the gate signal G on the basis of the voltage command value 262a from the DC voltage control unit 262. The current-type converter 30 controls each thyristor element 31 in accordance with the gate signal G, thereby controlling the DC voltage at the DC terminals 30a to be the second voltage value V2 (zero voltage) (step S204a).

Next, as in step S005 in embodiment 1, the DC capacitor 5 in each converter cell 10 of the voltage-type converter 20 is charged so that the voltage thereof reaches the set charge voltage value C2.

Next, the first converter control unit 50 commands the DC current control unit 54 by the command signal 51d, to switch the control of the voltage-type converter 20 from voltage control by the DC voltage control unit 53 to current control by the DC current control unit 54.

Then, the DC current control unit 54 generates the current command value 54a for causing second current I2 to flow through the DC circuit 40 so that the second current I2 is not greater than 20% of the rated current value Im and has such a magnitude that the current does not become intermittent, i.e., does not become negative due to noise or the like (step S205a).

Since the second current I2 is not greater than 20% of the rated current value Im, the second current I2 does not cause a great influence on the second AC circuit 10B.

Next, in a state in which the second current I2 is flowing continuously, the second converter control unit 260 commands the DC voltage control unit 262 by the command signal 61b, so that the DC voltage control unit 262 generates the voltage command value 262a for gradually increasing the DC voltage of the DC terminals 30a to rated voltage which is a set value (step S205b).

After the DC voltage at the DC terminals 30a has become the rated voltage, the first converter control unit 50 causes the DC current control unit 54 to generate the current command value 54a for gradually increasing the DC current to rated current which is a set value (step S007).

The control for starting the power conversion device 100 while the second current I2 having such a magnitude as not to become negative is caused to flow through the DC circuit 40, i.e., slight current not greater than the rated current value Im is caused to flow through the DC circuit 40 continuously, as shown in the above steps S205a to S007, is referred to as second starting control.

Thus, the power conversion device 100 is started, so that desired power supply from the first AC circuit 10A to the second AC circuit 10B is started (step S008).

In the power conversion device of the present embodiment configured as described above, after execution of the first starting control, the control unit switches the second power converter from the bypass-pair state to switching control of the semiconductor element for performing power conversion, and the control unit controls one of the first power converter or the second power converter so as to perform current control for causing output current thereof to follow a current command value, thus performing second starting control so that second current which is not greater than 20% of the rated current value and has such a magnitude as not to become negative flows through the DC circuit continuously.

As described in embodiment 1, if all the semiconductor elements in the current-type converter are turned off and flowing current is interrupted, overvoltage might be applied to the semiconductor elements. Therefore, it is necessary to form a current circuit for constantly causing current to flow. However, in a case where the current-type converter is composed of semiconductor elements such as thyristors, when the converter current is small, the current might become negative due to noise or the like, thus becoming intermittent. In this case, the semiconductor elements are turned off and thus the current circuit is not formed, so that overvoltage might be applied to the semiconductor elements.

In the present embodiment, the voltage-type converter causes the second current having such a magnitude as not to become negative, to flow through the DC circuit continuously, whereby overvoltage of the semiconductor elements can be further prevented.

In addition, since the second current is controlled to be within 20% of the rated current value, excessive reactive power is prevented from being outputted to the interconnected AC circuit and the influence on the grid voltage in the AC grid can be suppressed. Thus, it is possible to provide a power conversion device that has a high function, is low in cost, and is highly reliable.

In the power conversion device of the present embodiment configured as described above, in the second starting control, while causing the second current to flow through the DC circuit continuously, the control unit controls, of the first and second power converters, one that is not undergoing the current control, so as to perform voltage control for causing DC voltage of the DC circuit to follow a voltage command value, thereby gradually increasing the voltage of the DC circuit to a set value.

As described above, while the second current having such a magnitude as not to become negative is caused to flow through the DC circuit continuously, the voltage of the DC circuit is increased to the rated voltage which is a set value.

Thus, while overvoltage of the semiconductor elements is prevented, and excessive reactive power is prevented from being outputted to the interconnected AC circuit, so that there is no influence on the AC grid, the DC voltage can be gradually increased to the rated voltage which is a set value. Thus, it is possible to provide a power conversion device having even higher reliability.

In the power conversion device of the present embodiment configured as described above, after gradually increasing the voltage of the DC circuit to the set value in the second starting control, the control unit gradually increases the second current to a set value by, of the first and second power converters, one that is undergoing the current control.

Here, in the present embodiment, the voltage of the DC circuit is set at the first set value (zero voltage) in the first starting control. Therefore, for example, if current is increased while the voltage of the DC circuit is zero voltage, the power factor of the current-type converter decreases and all the output AC power becomes reactive power, thus causing a great influence on the interconnected AC circuit. In the present embodiment, after the voltage of the DC circuit is gradually increased, the DC current is gradually increased from the slight second current to the rated current which is a set value.

In this way, after the power factor of the current-type converter is improved by increasing the DC voltage, the DC current is increased to the rated current, whereby excessive reactive power is prevented from being outputted to the AC grid, thus enabling such start of the power conversion device as not to cause a great influence on the AC grid.

In the power conversion device of the present embodiment configured as described above, in the second starting control in a case of supplying power from the first power converter to the second power converter, the control unit switches the second power converter from the bypass-pair state to the switching control of the semiconductor element for performing power conversion, and controls the DC voltage at the second DC terminal to be a second voltage value not greater than the first voltage value through voltage control of the second power converter, and the control unit causes the second current to flow through the DC circuit continuously through the current control by the first power converter.

As described above, after execution of the first starting control, when the semiconductor element of the current-type converter is switched from the bypass-pair state to the switching control, the DC terminal of the current-type converter is once controlled to be the second voltage (zero voltage). Thus, sharp voltage change in the DC voltage of the DC circuit when the current-type converter is switched to the switching control is suppressed, whereby the power conversion device can be stably started.

In the power conversion device of the present embodiment configured as described above, the second voltage value is a value within 0 V+3% of rated voltage of the DC circuit.

Thus, it is possible to assuredly suppress sharp voltage change in the DC voltage of the DC circuit when the current-type converter is switched to the switching control.

Embodiment 3

Hereinafter, embodiment 3 of the present disclosure will be described, focusing on difference from the above embodiments 1 and 2, with reference to the drawings. The same parts as in the above embodiments 1 and 2 are denoted by the same reference characters and description thereof is omitted.

Figure 10:
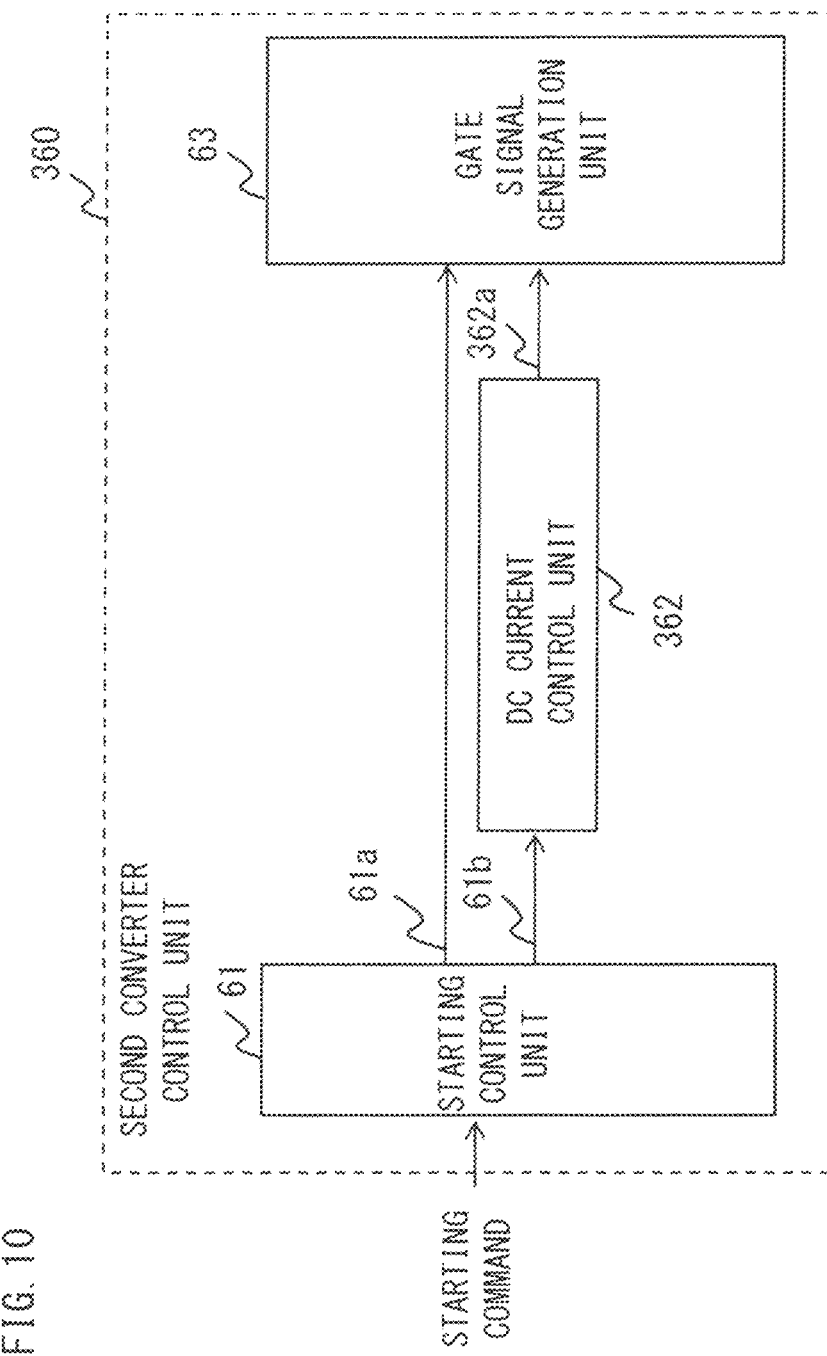
FIG. 10 is a configuration diagram of a second converter control unit for controlling a current-type converter according to embodiment 3.

FIG. 10 is a configuration diagram of a second converter control unit 360 for controlling the current-type converter 30 according to embodiment 3.

Figure 11:
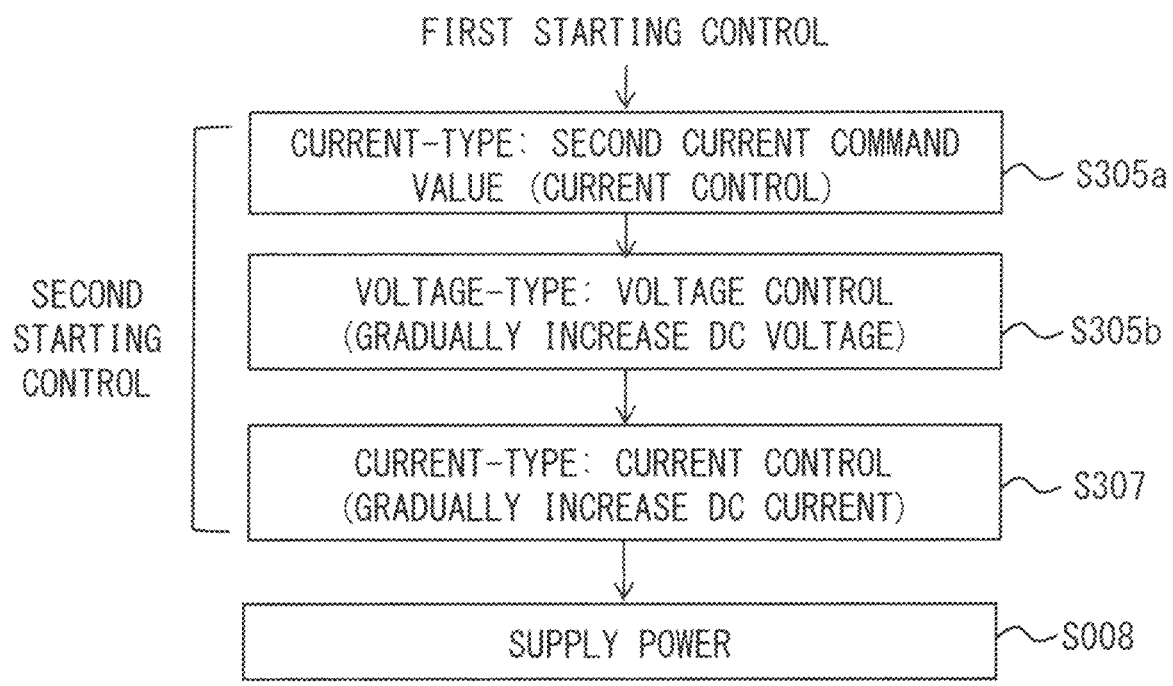
FIG. 11 is a flowchart showing control at the time of starting the power conversion device according to embodiment 3.

FIG. 11 is a flowchart showing control at the time of starting the power conversion device 100, performed by the first converter control unit 50 and the second converter control unit 360 according to embodiment 3.

In embodiments 1 and 2, the power conversion device 100 supplies power from the first AC circuit 10A to the second AC circuit 10B. The power conversion device 100 according to the present embodiment supplies power from the second AC circuit 10B to the first AC circuit 10A.

The first AC circuit 10A is not particularly limited, and is a motor, an electric generator, a power grid, or the like.

As shown in FIG. 10, in the second converter control unit 360 shown in the present embodiment, a DC current control unit 362 is provided instead of the motor current control unit 62 in the second converter control unit 60 shown in embodiment 1.

As in the first starting control shown in embodiment 1, also in the present embodiment, first starting control is performed through steps S001 to S004. In FIG. 11, steps S001 to S004 for the first starting control are not shown.

In the first starting control, in a case where the first AC circuit 10A is a motor, charging of the DC capacitor 5 in each converter cell 10 of the voltage-type converter 20 may be performed by reversely rotating the motor temporarily, for example.

After the voltage-type converter 20 and the current-type converter 30 are started through execution of the first starting control, the starting control unit 61 of the second converter control unit 360 commands the gate signal generation unit 63 by the command signal 61a, to start gate-ON/OFF operations of the thyristor elements 31 in the current-type converter 30. When power conversion is started by this switching control, at the same time, the starting control unit 61 commands the DC current control unit 362 by the command signal 61b. Then, the DC current control unit 362 generates a current command value 362a for causing the second current to flow through the DC circuit 40 so that the second current is not greater than 20% of the rated current value Im and has such a magnitude that the current does not become intermittent (step S305a).

In this way, while slight current not greater than the rated current value Im is caused to flow through the DC circuit 40 continuously, second starting control for starting the power conversion device 100 is started.

Since the second current is controlled to be a value not greater than 20% of the rated current value Im, the second current does not cause a great influence on the first AC circuit 10A.

Next, the first converter control unit 50 for controlling the voltage-type converter 20 causes the DC voltage control unit 53 to generate the voltage command value 53a for gradually increasing the DC voltage of the DC terminals 20a to the rated voltage which is a set value (step S305b).

After the DC voltage at the DC terminals 20a has become the rated voltage, the second converter control unit 360 causes the DC current control unit 362 to generate the current command value 362a for gradually increasing the DC current to the rated current which is a set value (step S307).

By starting the power conversion device 100 through the control as described above, it becomes possible to start the power conversion device 100 so that excessive current beyond the rated current value Im does not flow and excessive voltage is not applied in the voltage-type converter 20 and the current-type converter 30.

Thus, also in the case of supplying power from the second AC circuit to the first AC circuit, it is possible to provide a power conversion device that has a high function, is low in cost, and is highly reliable so that the semiconductor elements can be protected, as in embodiments 1 and 2.

Embodiment 4

Hereinafter, embodiment 4 of the present disclosure will be described, focusing on difference from the above embodiment 3, with reference to the drawings. The same parts as in the above embodiment 3 are denoted by the same reference characters and description thereof is omitted.

Figure 12:
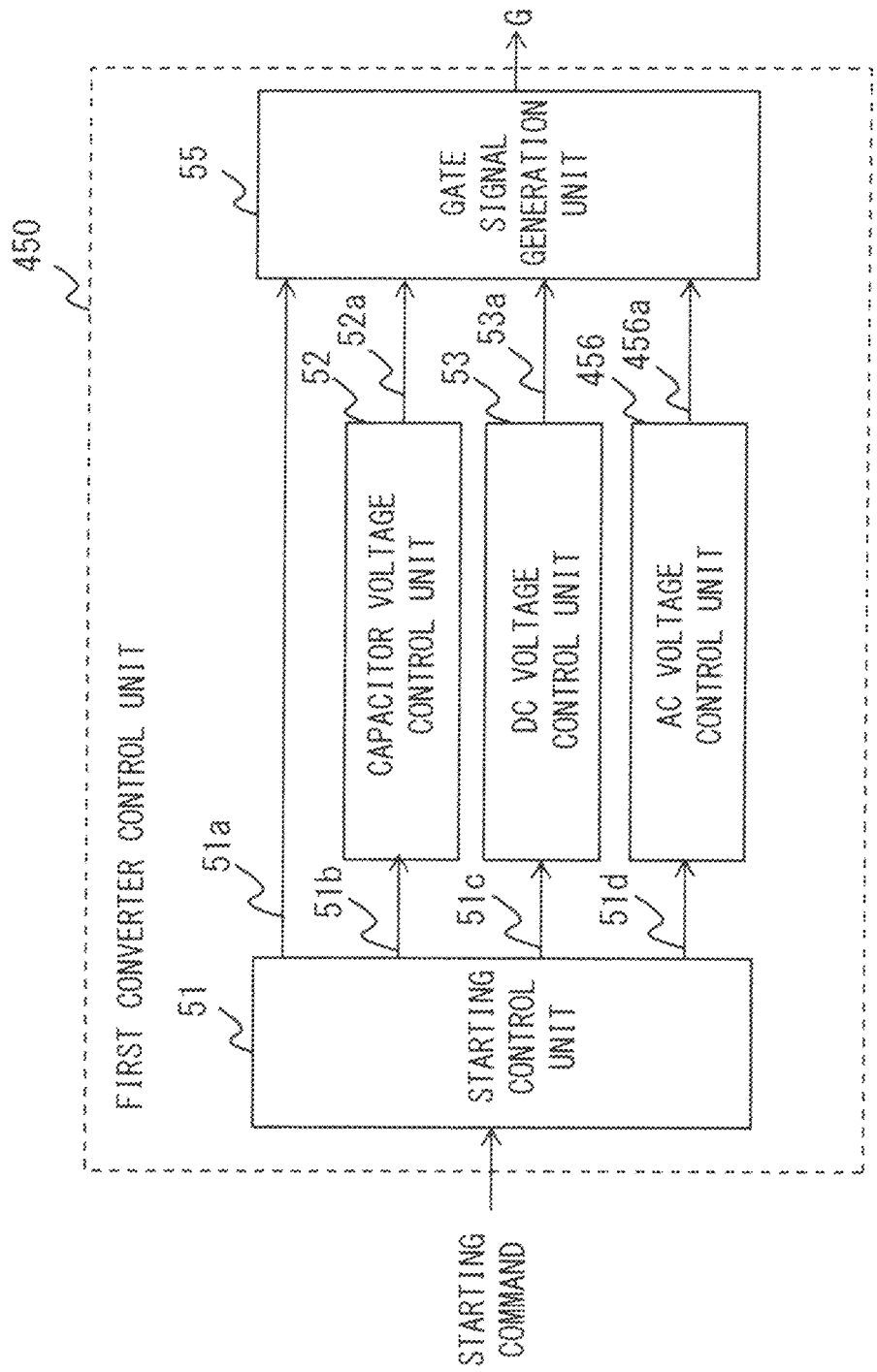
FIG. 12 is a configuration diagram of a first converter control unit for controlling a voltage-type converter according to embodiment 4.

FIG. 12 is a configuration diagram of a first converter control unit 450 for controlling the voltage-type converter 20 according to embodiment 4.

FIG. 13 is a flowchart showing control at the time of starting the power conversion device 100, performed by the first converter control unit 450 and the second converter control unit 360 according to embodiment 4.

Also in the power conversion device 100 according to the present embodiment, as in embodiment 3, power is supplied from the second AC circuit 10B to the first AC circuit 10A.

As shown in FIG. 12, in the first converter control unit 450 shown in the present embodiment, an AC voltage control unit 456 is provided instead of the DC current control unit 54 in the first converter control unit 50 shown in embodiment 1.

Hereinafter, control at the time of starting the power conversion device 100 of the present embodiment will be described.

Before the power conversion device 100 is started, the switch 11A and the switch 11B are both controlled in an opened state and the power conversion device 100 is not interconnected to the AC side.

First, the starting control unit 61 of the second converter control unit 360 commands the gate signal generation unit 63 by the command signal 61a, to control the current-type converter 30 into a gate-OFF state. Then, the starting control unit 61 controls the switch 11B into a closed state, thereby interconnecting the current-type converter 30 in a gate-OFF state to the second AC circuit 10B (step S401).

Next, the starting control unit 51 of the first converter control unit 450 commands the gate signal generation unit 55 by the command signal 51a, to control the voltage-type converter 20 into a gate-OFF state (step S401a).

At this time, the switch 11A is controlled in an opened state and thus the voltage-type converter 20 is not interconnected to the first AC circuit 10A. Therefore, the DC capacitor 5 in each converter cell 10 of the voltage-type converter 20 has not been charged.

Next, as in step S004 in embodiment 1, the second converter control unit 360 commands the gate signal generation unit 63 by the starting control unit 61, to control the current-type converter 30 into a bypass-pair state.

Here, since the DC capacitors 5 in the voltage-type converter 20 have not been charged, the DC voltage at the DC terminals 20a of the voltage-type converter 20 becomes zero voltage. Therefore, by performing the control shown in steps S401 to S004 described above, first control for starting the power conversion device 100 while controlling current flowing through the DC circuit 40 to be the first current I1 not greater than the rated current value Im, is performed.

Next, the starting control unit 61 of the second converter control unit 360 commands the gate signal generation unit 63 by the command signal 61a, to start gate-ON/OFF operations of the thyristor elements 31 in the current-type converter 30. When power conversion is started by this switching control, at the same time, the starting control unit 61 commands the DC current control unit 362 by the command signal 61b, so that the DC current control unit 362 generates the current command value 362a for causing the second current I2 to flow through the DC circuit 40 so that the second current I2 is not greater than 20% of the rated current value Im and has such a magnitude that the current does not become intermittent (S405a).

When the second current I2 is caused to flow through the DC circuit 40 by the current-type converter 30, the DC capacitor 5 in each converter cell 10 of the voltage-type converter 20 is charged with the second current I2 (step S405a1).

Next, after the DC capacitors 5 are charged to the set charge voltage value C1, the starting control unit 51 of the first converter control unit 450 commands the gate signal generation unit 55 by the command signal 51a, to start gate-ON/OFF operations of the switching elements 1 of the voltage-type converter 20. At the same time, the starting control unit 51 commands the AC voltage control unit 456 by the command signal 51d, so that the AC voltage control unit 456 generates an AC voltage command value 456a for charging the DC capacitors 5 to the set charge voltage value C2 (step S405a2).

Next, in a state in which the second current I2 is flowing continuously, the first converter control unit 450 commands the DC voltage control unit 53 by the command signal 51c, so that the DC voltage control unit 53 generates the voltage command value 53a for gradually increasing the DC voltage of the DC terminals 20a to the rated voltage which is a set value (step S405b).

After the DC current at the DC terminals 20a has become the rated voltage, the second converter control unit 360 causes the DC current control unit 362 to generate the current command value 362a for gradually increasing the DC current to the rated current which is a set value (step S407).

By starting the power conversion device 100 through the control as described above, it becomes possible to start the power conversion device 100 so that excessive current beyond the rated current value Im does not flow and excessive voltage is not applied in the voltage-type converter 20 and the current-type converter 30. Thus, starting can be performed without excessively stressing the current-type converter 30.

Next, the first converter control unit 450 causes the AC voltage control unit 456 to generate the AC voltage command value 456a so that the output AC voltage of the voltage-type converter 20 becomes desired AC voltage (step S008).

At this time, in a case where the first AC circuit 10A is, for example, a power grid and the grid is in a blackout state so that there is no power supply, i.e., a power supply lost state, it is possible to perform black start to start up the power grid by applying AC voltage to the first AC circuit 10A. Therefore, an electric generator, a phase modifier, or the like is not needed in the AC grid (first AC circuit 10A), and thus it becomes possible to supply power not depending on the AC grid. In addition, also in a case where the power grid of the first AC circuit 10A is such a minor grid that the short-circuit capacity thereof is not greater than a threshold, power can be supplied by the voltage-type converter 20 in the same manner.

In a case where the AC grid of the first AC circuit 10A has voltage, AC voltage at the interconnection point between the first AC circuit 10A and the voltage-type converter 20 is measured by an AC voltage measuring unit (not shown). Then, the AC voltage control unit 456 of the first converter control unit 450 generates the AC voltage command value 456a so that the output AC voltage of the voltage-type converter 20 becomes voltage synchronized with the measured AC voltage.

Then, after the output AC voltage of the voltage-type converter 20 is synchronized with the AC voltage at the interconnection point, the starting control unit 51 controls the switch 11A into a closed state, thereby interconnecting the voltage-type converter 20 to the first AC circuit 10A. In this case, the voltage-type converter 20 has generated the AC voltage synchronized with the AC grid before interconnection with the AC grid, and therefore it is possible to perform grid interconnection without causing disturbance to the AC grid.

In the power conversion device of the present embodiment configured as described above, where a short-circuit capacity of a first AC circuit connected to an AC side of the first power converter is not greater than a threshold or the first AC circuit is in a power supply lost state, and the first power converter includes the semiconductor element of a self-turn-off type and an energy storage element, in the second starting control in a case of supplying power from the second power converter to the first power converter, while causing the second current to flow through the DC circuit continuously through the current control by the second power converter, the control unit charges the energy storage element of the first power converter with the second current, and after execution of the second starting control, the control unit outputs set AC voltage by the first power converter, to supply power to the first AC circuit.

As described above, even in a case where the first AC circuit is in a power supply lost state or a minor grid, the voltage-type converter is started by supplying power from the second AC circuit side, and thus it becomes possible to supply power by the voltage-type converter without depending on the AC grid. In addition, in the case where the first AC circuit side is in a power supply lost state, it becomes possible to perform black start of starting up the power grid without the need of an electric generator, a phase modifier, and the like in the first AC circuit. In this way, the power grid can be quickly recovered from power outage or the like, thus contributing to stabilization of the power grid.

The power conversion device of the present embodiment configured as described above further includes a circuit breaker at an interconnection point between an AC side of the first power converter and a first AC circuit connected to the AC side of the first power converter, wherein when AC voltage outputted from the first power converter has been adjusted to AC voltage synchronized with AC voltage of the first AC circuit at the interconnection point, the control unit controls the circuit breaker from an opened state into a closed state.

This configuration enables grid interconnection of the power conversion device without causing disturbance to the AC grid. Thus, it is possible to provide a power conversion device that has a high function, is low in cost, is highly reliable, and does not depend on the grid condition of the power grid.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 switching element (semiconductor element)
4 series unit
5 DC capacitor (energy storage element)
10 converter cell
20 voltage-type converter (first power converter)
21 leg circuit
22 positive arm
23 negative arm
30 current-type converter (second power converter)
40 DC circuit
40P, 40N DC bus
50, 450 first converter control unit (control unit)
60, 260, 360 second converter control unit (control unit)
10A first AC circuit
10B second AC circuit
20a DC terminal (first DC terminal)
30a DC terminal (second DC terminal)
100 power conversion device

The invention claimed is:

1. A power conversion device comprising:
a voltage-sourced first power converter and a line-commutated second power converter which have semiconductor elements for controlling conduction and interruption of current and perform power conversion between AC and DC; and
a controlling circuitry for controlling the first power converter and the second power converter, wherein
first DC terminals on a DC side of the first power converter and second DC terminals on a DC side of the second power converter are connected via a DC circuit, and power is transmitted/received between different AC sides via the DC circuit, and
in first starting control for starting the first power converter and the second power converter, the controlling circuitry controls the semiconductor element provided in at least one of the first power converter or the second power converter, to adjust DC voltage at the first DC terminals of the first power converter to a set first voltage value, and controls the semiconductor element of the second power converter so as to form a current path through which current flows via the DC circuit between the first power converter and the second power converter, thereby controlling current flowing through the DC circuit to be first current not greater than a rated current value of the semiconductor elements,
wherein in the first starting control, the controlling circuitry controls the semiconductor element of the first power converter to adjust the voltage of the first DC terminals of the first power converter to the first voltage value, and controls the semiconductor element of the positive DC bus side and the semiconductor element of the negative DC bus side connected in series of the second power converter by turning on at the same time so that the second power converter comes into a bypass-pair state for forming the current path.

2. The power conversion device according to claim 1, further comprising a circuit breaker at an interconnection point between an AC side of the first power converter and a first AC circuit connected to the AC side of the first power converter, wherein
when AC voltage outputted from the first power converter has been adjusted to AC voltage synchronized with AC voltage of the first AC circuit at the interconnection point, the controlling circuitry controls the circuit breaker from an opened state into a closed state.

3. The power conversion device according to claim 1, wherein
the current path through which the first current flows in the first starting control is a closed circuit formed via the DC circuit between the first power converter and the second power converter.

4. The power conversion device according to claim 1, wherein
the first voltage value is set on the basis of a resistance value in the DC circuit.

5. The power conversion device according to claim 1, wherein
the first voltage value is a value within 0 V+3% of rated voltage of the DC circuit.

6. The power conversion device according to claim 1, wherein
the first power converter is a voltage-sourced power converter configured using the semiconductor element of a self-turn-off type, and
the second power converter is a line-commutated power converter configured using a thyristor element as the semiconductor element.

7. The power conversion device according to claim 1, wherein
the first power converter includes a plurality of leg circuits connected to AC lines for respective phases and each having a positive arm and a negative arm connected in series, the plurality of leg circuits being connected in parallel between positive and negative DC buses, and
each of the positive arm and the negative arm of each leg circuit includes a plurality of converter cells connected in series, the plurality of converter cells each being composed of a series unit of the semiconductor elements of a self-turn-off type connected in series to each other, and an energy storage element connected in parallel to the series unit.

8. The power conversion device according to claim 1, further comprising a circuit breaker at an interconnection point between an AC side of the first power converter and a first AC circuit connected to the AC side of the first power converter, wherein
when AC voltage outputted from the first power converter has been adjusted to AC voltage synchronized with AC voltage of the first AC circuit at the interconnection point, the controlling circuitry controls the circuit breaker from an opened state into a closed state.

9. The power conversion device according to claim 1, wherein
the current path through which the first current flows in the first starting control is a closed circuit formed via the DC circuit between the first power converter and the second power converter.

10. The power conversion device according to claim 1, wherein
after execution of the first starting control,
the controlling circuitry switches the second power converter from the bypass-pair state to switching control of the semiconductor element for performing power conversion, and
the controlling circuitry controls one of the first power converter or the second power converter so as to perform current control for causing output current thereof to follow a current command value, thus performing second starting control so that second current which is not greater than 20% of the rated current value and has such a magnitude as not to become negative flows through the DC circuit continuously.

11. The power conversion device according to claim 10, wherein
in the second starting control in a case of supplying power from the first power converter to the second power converter, the controlling circuitry switches the second power converter from the bypass-pair state to the switching control of the semiconductor element for performing power conversion, and controls the DC voltage at the second DC terminal to be a second voltage value not greater than the first voltage value through voltage control of the second power converter, and the controlling circuitry causes the second current to flow through the DC circuit continuously through the current control by the first power converter.

12. The power conversion device according to claim 10, wherein
where a short-circuit capacity of a first AC circuit connected to an AC side of the first power converter is not greater than a threshold or the first AC circuit is in a power supply lost state, and the first power converter includes the semiconductor element of a self-turn-off type and an energy storage element, in the second starting control in a case of supplying power from the second power converter to the first power converter,
while causing the second current to flow through the DC circuit continuously through the current control by the second power converter, the controlling circuitry charges the energy storage element of the first power converter with the second current, and
after execution of the second starting control, the controlling circuitry outputs set AC voltage by the first power converter, to supply power to the first AC circuit.

13. The power conversion device according to claim 10, wherein
in the second starting control, while causing the second current to flow through the DC circuit continuously, the controlling circuitry controls, of the first and second power converters, one that is not undergoing the current control, so as to perform voltage control for causing DC voltage of the DC circuit to follow a voltage command value, thereby gradually increasing the voltage of the DC circuit to a set value.

14. The power conversion device according to claim 11, wherein
the second voltage value is a value within 0 V+3% of rated voltage of the DC circuit.

15. The power conversion device according to claim 13, wherein
in the second starting control in a case of supplying power from the first power converter to the second power converter, the controlling circuitry switches the second power converter from the bypass-pair state to the switching control of the semiconductor element for performing power conversion, and controls the DC voltage at the second DC terminal to be a second voltage value not greater than the first voltage value through voltage control of the second power converter, and the controlling circuitry causes the second current to flow through the DC circuit continuously through the current control by the first power converter.

16. The power conversion device according to claim 13, wherein
where a short-circuit capacity of a first AC circuit connected to an AC side of the first power converter is not greater than a threshold or the first AC circuit is in a power supply lost state, and the first power converter includes the semiconductor element of a self-turn-off type and an energy storage element, in the second starting control in a case of supplying power from the second power converter to the first power converter,
while causing the second current to flow through the DC circuit continuously through the current control by the second power converter, the controlling circuitry charges the energy storage element of the first power converter with the second current, and
after execution of the second starting control, the controlling circuitry outputs set AC voltage by the first power converter, to supply power to the first AC circuit.

17. The power conversion device according to claim 13, wherein
after gradually increasing the voltage of the DC circuit to the set value in the second starting control, the controlling circuitry gradually increases the second current to a set value by, of the first and second power converters, one that is undergoing the current control.

18. The power conversion device according to claim 17, wherein
in the second starting control in a case of supplying power from the first power converter to the second power converter, the controlling circuitry switches the second power converter from the bypass-pair state to the switching control of the semiconductor element for performing power conversion, and controls the DC voltage at the second DC terminal to be a second voltage value not greater than the first voltage value through voltage control of the second power converter, and the controlling circuitry causes the second current to flow through the DC circuit continuously through the current control by the first power converter.

19. The power conversion device according to claim 17, wherein
where a short-circuit capacity of a first AC circuit connected to an AC side of the first power converter is not greater than a threshold or the first AC circuit is in a power supply lost state, and the first power converter includes the semiconductor element of a self-turn-off type and an energy storage element, in the second starting control in a case of supplying power from the second power converter to the first power converter,
while causing the second current to flow through the DC circuit continuously through the current control by the second power converter, the controlling circuitry charges the energy storage element of the first power converter with the second current, and
after execution of the second starting control, the controlling circuitry outputs set AC voltage by the first power converter, to supply power to the first AC circuit.

* * * * *